United States Patent [19]

Yoshieda et al.

[11] 4,299,027
[45] Nov. 10, 1981

[54] APPARATUS FOR APPLYING REINFORCING FILM PIECES TO A PAIR OF SLIDE FASTENER STRINGERS

[75] Inventors: Keiichi Yoshieda, Kurobe; Kazuki Kuse, Toyama, both of Japan

[73] Assignee: Yoshida Kogyo, K.K., Japan

[21] Appl. No.: 121,317

[22] Filed: Feb. 14, 1980

[30] Foreign Application Priority Data

Feb. 24, 1979 [JP] Japan ................................ 54/21234

[51] Int. Cl.³ .............................................. B23P 21/00
[52] U.S. Cl. ....................................... 29/766; 29/767; 156/66; 156/257; 156/513
[58] Field of Search ................ 29/33.2, 408, 410, 766, 29/767, 819; 156/66, 257, 513

[56] References Cited

U.S. PATENT DOCUMENTS

| | | | |
|---|---|---|---|
| 3,340,594 | 9/1967 | Frohlich et al. | 29/408 |
| 3,353,256 | 11/1967 | Frohlich et al. | 29/766 X |
| 3,488,239 | 1/1970 | Heimberger | 29/408 X |
| 3,793,719 | 2/1974 | Ebata | 29/408 |
| 3,800,394 | 4/1974 | Ruhrmann | 29/408 |
| 3,872,571 | 3/1975 | Douri | 29/408 |
| 4,110,891 | 9/1978 | Akashi | 29/408 |

FOREIGN PATENT DOCUMENTS 449093 6/1936 United Kingdom ................. 29/410
948794 2/1964 United Kingdom ................. 29/408

*Primary Examiner*—Ervin M. Combs
*Attorney, Agent, or Firm*—Robert E. Burns; Emmanuel J. Lobato; Bruce L. Adams

[57] ABSTRACT

An apparatus for applying pieces of reinforcing film of synthetic resin to a pair of continuous slide fastener stringers at longitudinally spaced locations thereof, comprises means for feeding the stringers longitudinally along a first path selectively at a rapid rate or a slow rate, means for sensing one of the locations on the stringers at a time to switch the feeding means from a rapid rate to a slow rate mode of operation and then to a stopping mode, and for locating said one of the locations on the stringers in a position for the application of one of the pieces of reinforcing film, and means for holding the stringers during the film-piece application. The apparatus also comprises means for intermittently feeding an elongate web of reinforcing film longitudinally along a second path extending transversely to the first path, means for holding a distal end of the elongate web which has passed across the first path, means for guiding the elongate web toward the holding means, means for successively forming the pieces of reinforcing film one at a time from the elongate web and means for applying said one of the pieces of reinforcing film to the stringers are at rest.

14 Claims, 17 Drawing Figures

F I G. 12
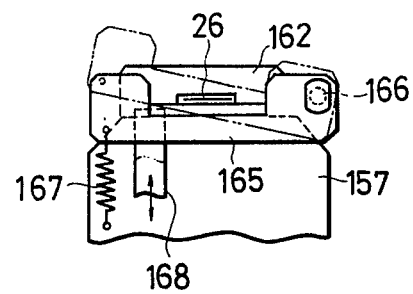
F I G. 13
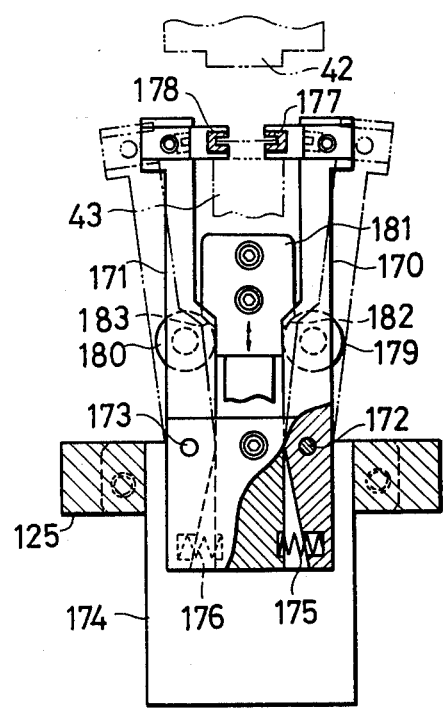

4,299,027

APPARATUS FOR APPLYING REINFORCING FILM PIECES TO A PAIR OF SLIDE FASTENER STRINGERS

BACKGROUND OF THE INVENTION

Field of the Invention

The present invention relates to an apparatus for applying pieces of reinforcing film of synthetic resin to a pair of slide fastener stringers at their longitudinally spaced element-free gaps.

SUMMARY OF THE INVENTION

According to the present invention, an apparatus for applying pieces of reinforcing film of synthetic resin to a pair of continuous slide fastener stringers at longitudinally spaced locations thereof, comprises means for feeding the stringers longitudinally along a first path selectively at a rapid rate or a slow rate, means for sensing one of the locations on the stringers at a time to switch the feeding means from a rapid rate to a slow rate mode of operation and then to a stopping mode, and for locating said one of the locations on the stringers in a position for the application of one of the pieces of reinforcing film, and means for holding the stringers during the film-piece application. The apparatus also comprises means for intermittently feeding an elongate web of reinforcing film longitudinally along a second path extending transversely to the first path, means for holding a distal end of the elongate web which has passed across the first path, means for guiding the elongate web toward the holding means, means for successively forming the pieces of reinforcing film one at a time from the elongate web and means for applying said one of the pieces of reinforcing film to the stringers at said one of the locations thereof while the stringers are at rest.

It is an object of the present invention to provide an apparatus for speedily and reliably applying pieces of reinforcing film to a pair of slide fastener stringers at longitudinally spaced locations thereof.

Another object of the present invention is to provide a film-piece applying apparatus having means for accurately locating a pair of slide fastener stringers in a position for the application of pieces of reinforcing film.

Still another object of the present invention is to provide such a film-piece applying apparatus having means for holding a piece of reinforcing film immovably under tension before being applied to a pair of slide fastener stringers.

Still another object of the present invention is to provide such a film-piece applying apparatus having a first path of slide fastener stringers and a second path of reinforcing film, the second path being shiftable toward the first path in parallel relation for neat and reliable application of the film to the stringers.

The above and other objects and advantages of the present invention will become apparent from the detailed description when taken in conjunction with the accompanying drawings.

BRIEF DESCRIPTION OF THE DRAWINGS

FIG. 12 is a front elevational view of a cutter blade for the web of reinforcing film;

FIG. 13 is a front elevational view of guides for the web of reinforcing film;

DETAILED DESCRIPTION

Figure 2:
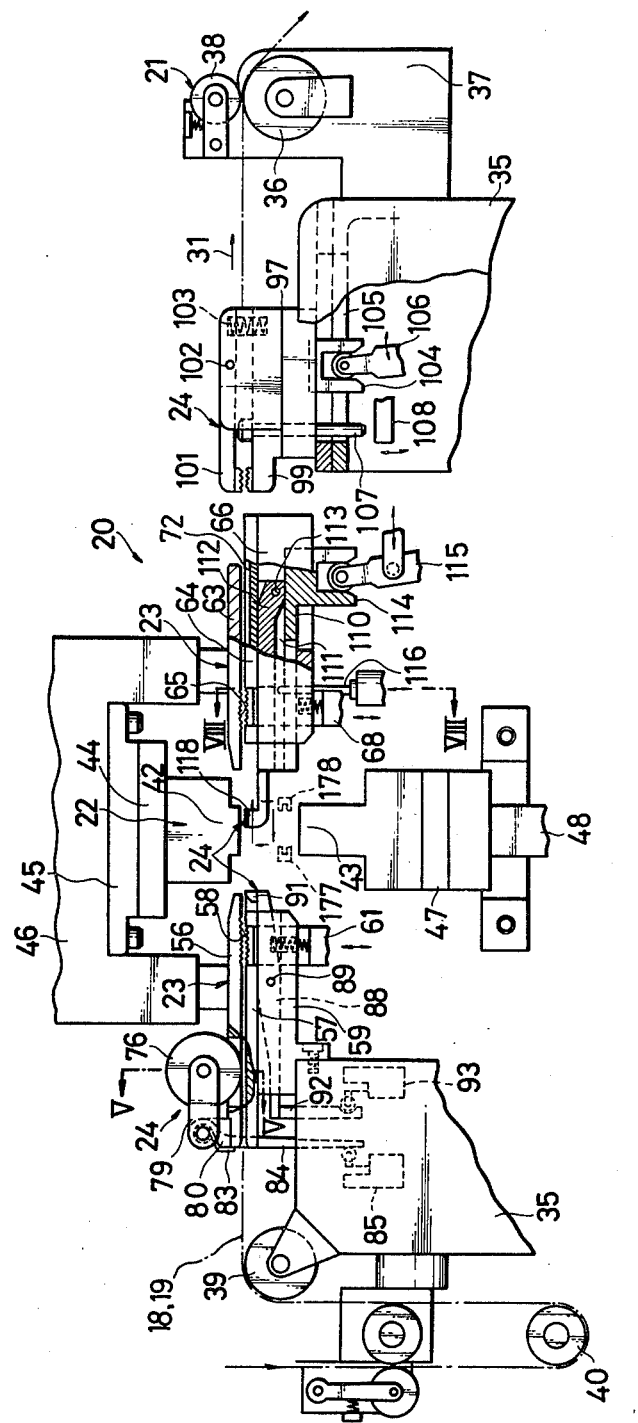
FIG. 2 is a front elevational view of the reinforcing-film applying apparatus of the present invention.
Figure 3:
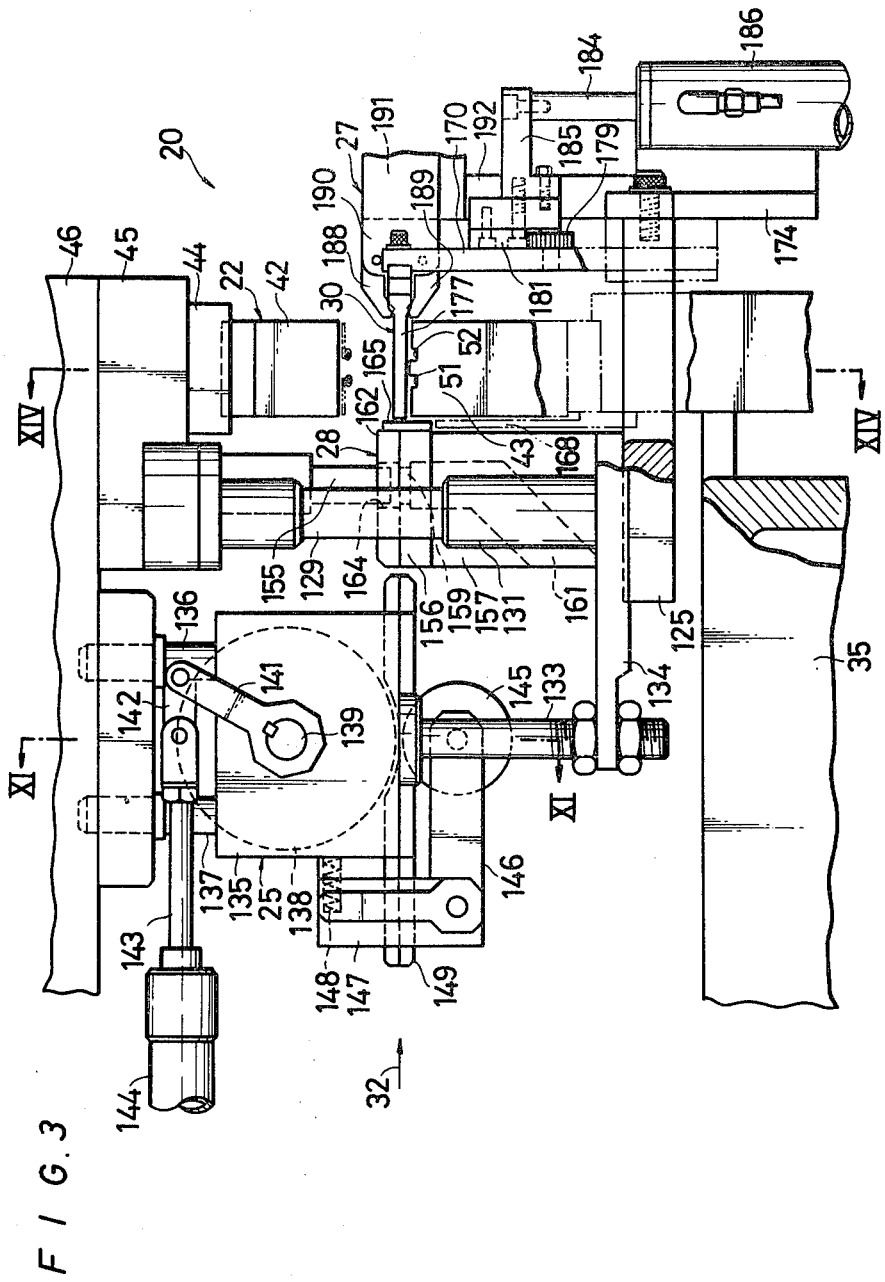
FIG. 3 is a side elevational view of the apparatus of FIG. 2.

FIGS. 2 and 3 show, in combination, an apparatus 20 for applying pieces of reinforcing film transversely to a pair of slide fastener stringers at their longitudinally spaced locations.

As shown in FIG. 2, the apparatus 20 comprises drive means 21 for intermittently feeding a pair of slide fastener stringers 18,19 (FIGS. 1 and 4) selectively at a rapid rate or a slow rate along a longitudinal path of travel in the direction of the arrow 31, means 22 for applying severed pieces 29 (FIGS. 1 and 4) of reinforcing film of synthetic resin one at a time to the stringers 18,19, means 23 for holding the stringers 18,19 while at rest during the application of the pieces 29 of reinforcing film, and means 24 for switching the feeding means 21 from a rapid to a slow rate mode of operation and then to a stopping mode, and for locating the stringers 18,19 at a position ready for the application of the pieces 29 of reinforcing film.

As shown in FIG. 3, the apparatus 20 also comprises drive means 25 for intermittently feeding an elongate web 26 (FIGS. 1 and 4) of reinforcing film along a longitudinal path of travel in the direction of the arrow 32 which is substantially perpendicular to the path of travel of the stringers 18,19, means 27 for holding a distal end of the elongate web 26 of reinforcing film which has passed across the stringers 18,19, means 28 for forming the pieces 29 from the elongate web 26 of reinforcing film, and means 30 for guiding the elongate web 26 until its distal end reaches the holding means 27.

In FIG. 2, the apparatus 20 includes a lower frame 35, and the drive means 21 comprises a drive roller 36 rotatably mounted on a bracket 37 secured to the lower frame 35 and a pinch roller 38 rotatably mounted on the bracket 37 and spring-biased against the drive roller 36 with the stringers 18,19 sandwiched therebetween. The stringers 18,19 are supplied from their rolls around a tension roller 40 movable vertically for keeping the supply of the stringers 18,19 at a constant rate, and then around a guide roller 39 rotatably mounted on the lower frame 35.

Figure 1:
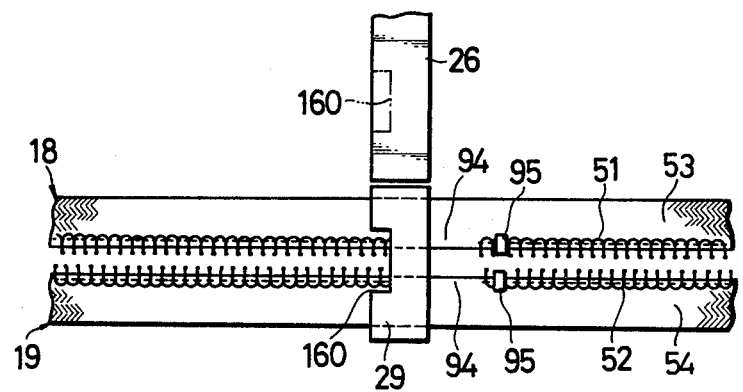
FIG. 1 is a fragmentary plan view of a pair of slide fastener stringers to which a severed piece of reinforcing film is applied on a reinforcing-film applying apparatus according to the present invention.
Figure 4:
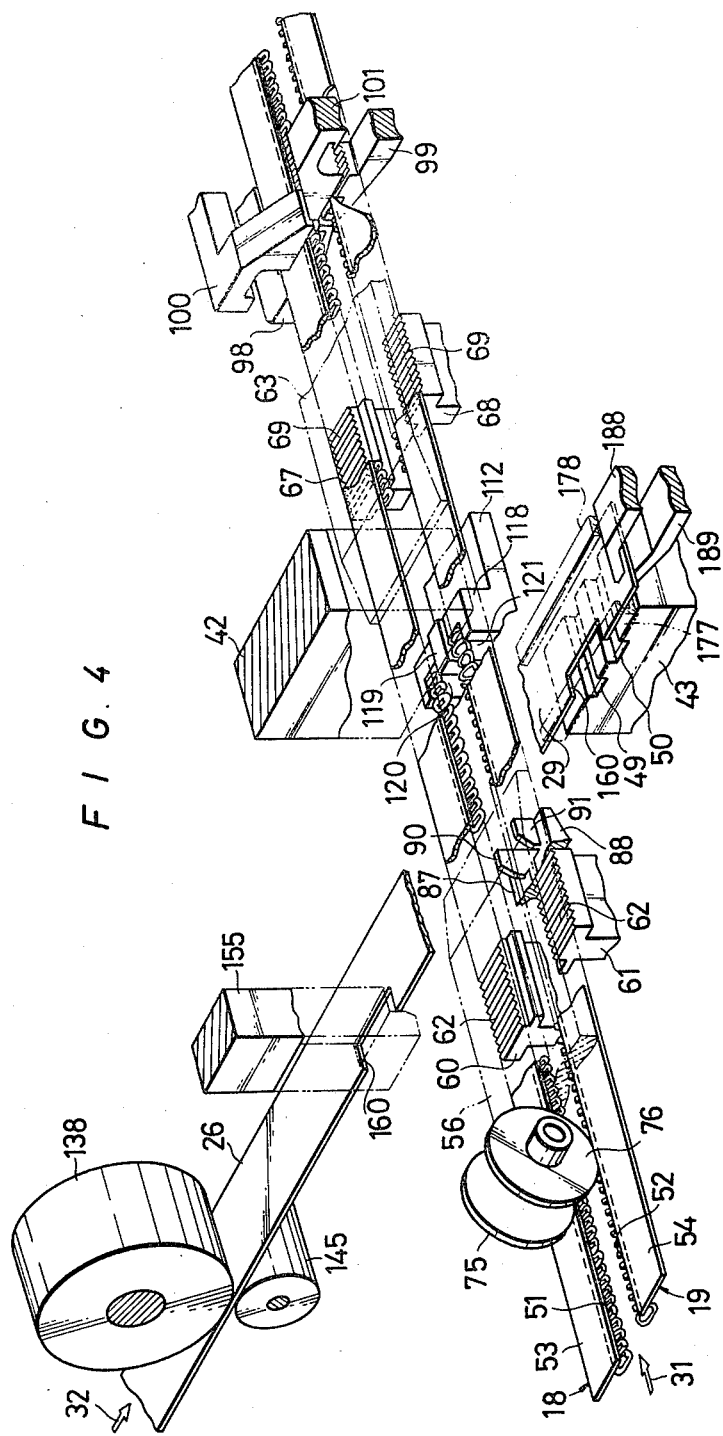
FIG. 4 is an enlarged diagrammatic perspective view showing the positional relationship between a pair of slide fastener stringers and a web of reinforcing film as they travel longitudinally.

The applying means 22 comprises a pair of upper and lower dies 42,43, the upper die 42 being secured via a thermal insulator 44 to a base plate 45 mounted on an upper frame 46 fixed with respect to the lower frame 35. The lower die 43 is vertically movable toward and away from the upper die 42 by a reciprocable ram 48 connected through a thermal insulator 47 to the lower die 43. The lower die 43 has in its upper face a pair of parallel grooves 49,50 (FIGS. 3 and 4) for receiving a pair of rows of coupling elements 51,52, respectively, mounted on and along confronting edges of respective stringer tapes 53,54 (FIGS. 1 and 4). The upper and lower dies 42,43 are heated typically by respective electric heaters. Alternatively, one of the upper and lower dies 42,43 may comprise an ultrasonic horn and the other may comprise an anvil.

Figure 5:
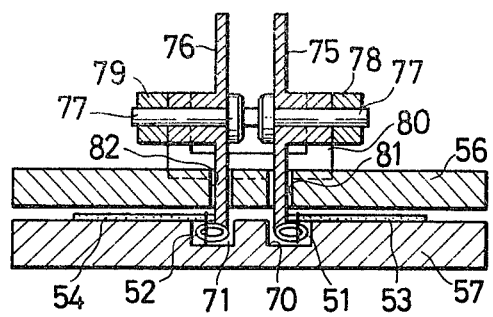
FIG. 5 is a cross-sectional view taken along line V—V of FIG. 2.
Figure 6:
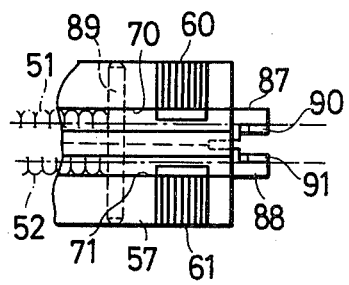
FIG. 6 is a fragmentary plan view of a pair of feeler arms for stopping the advancing movement of the stringers.

As shown in FIGS. 2 and 5, the holding means 23 includes a pair of upper and lower guide plates 56,57 disposed adjacent to and upstream of the dies 42,43 with respect to the direction of travel of the stringers 18,19, the upper and lower guide plates 56,57 being vertically spaced from each other a distance large enough to allow the stringer tapes 53,54 to pass therebetween. The upper guide plate 56 is mounted on the upper frame 46 and has a pair of downwardly facing serrated surfaces 58 (one shown in FIG. 2). The lower guide plate 57 is supported on a guide plate holder 59 secured to the lower frame 35. A pair of clamps 60,61 (FIGS. 4 and 6) are vertically movably disposed in the lower guide plate 57 and the guide plate holder 59 and are normally spring-biased downwardly. Each clamp 60,61 has an upwardly facing serrated surface 62 that confronts the downwardly facing serrated surface 58, and coacts therewith to firmly sandwich one of the stringer tapes 53,54 when the clamp 60,61 is urged upwardly against the upper guide plate 56. The lower guide plate 57 has in its upper face a pair of parallel guide grooves 70,71 (FIG. 5) receptive of the rows of coupling elements 51,52, respectively.

Figure 8:
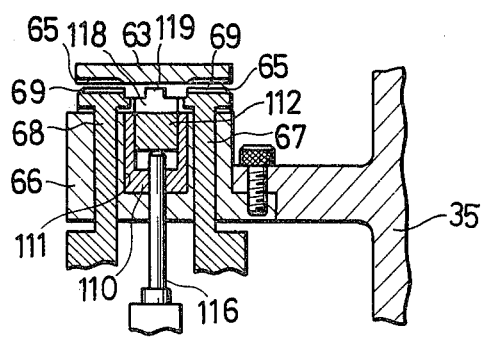
FIG. 8 is a cross-sectional view taken along line VIII—VIII of FIG. 2.

The holding means 23 also includes another pair of upper and lower guide plates 63,64 disposed adjacent to and downstream of the dies 42,43 with respect to the direction of travel of the stringers 18,19, the upper and lower guide plates 63,64 being vertically spaced from each other a distance large enough to allow the stringer tapes 53,54 to pass therebetween. The upper guide plate 63 is mounted on the upper frame 46 and has a pair of downwardly facing serrated surfaces 65 (FIG. 8). The lower guide plate 64 is supported on a guide plate holder 66 secured to the lower frame 35. A pair of clamps 67,68 (FIGS. 4 and 8) are vertically movably disposed in the lower guide plate 64 and the guide plate holder 66 and are normally spring-biased downwardly. Each clamp 67,68 has an upwardly facing serrated surface 69 that confronts the downwardly facing serrated surface 65, and coacts therewith to firmly sandwich one of the stringer tapes 53,54 when the clamp 67,68 is urged upwardly against the upper guide plate 63. The lower guide plate 64 has in its upper face a pair of parallel guide grooves 72 (one shown in FIG. 2) receptive of the rows of coupling elements 51,52, respectively.

The switching and locating means 24 of FIGS. 2, 4 and 5 includes a pair of spaced, cantilevered detector rolls 75,76 rotatable on a pair of respective shafts 77,77 mounted on a pair of support arms 78,79 pivotally mounted on a bracket 80 fixed to the lower frame 35. The upper guide plate 56 has a pair of parallel slots 81,82 (FIG. 5) through which peripheral portions of the respective detector rolls 75,76 extend downwardly into the guide grooves 70,71, respectively, in the lower guide plate 57. The detector rolls 75,76 are normally urged downwardly across the space between the upper and lower guide plates 56,57 into rolling engagement with the respective rows of coupling elements 51,52, under the force of a spring 83 acting between the support arms 78,79 and the bracket 80. An actuator lever 84 is fixed to one of the support arms 78,79 and extends downwardly into the lower frame 35, in which the distal end of the lever 84 can actuate a microswitch 85 when the lever 84 swings clockwise (FIG. 2), that is, when the detector rolls 75,76 are displaced downwardly into element-free gaps or spaces 94,94 (FIG. 1). Upon actuation of the microswitch 85, the drive roller 36 switches from a rapid-rate mode of operation to a slow-rate mode of operation.

Figure 7:
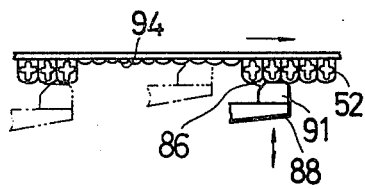
FIG. 7 is a fragmentary side elevational view of one of the feeler arms.

The switching and locating means 24 also comprises a pair of feeler arms 87,88 (FIGS. 4 and 6) pivotally mounted by a common pin 89 in a longitudinal slot in the guide plate holder 59 (FIG. 2) and having on their distal ends a pair of respective feeler projections 90,91 each having a bevel 86 (FIG. 7) that project upwardly into paths of travel of the rows of coupling elements 51,52. The other ends of the feeler arms 87,88 are jointly attached to an actuator lever 92 which can actuate a microswitch 93 in the lower frame 35 when the bevels 86 of the feeler projections 90,91 are pushed downwardly by terminal coupling elements adjacent to element-free gaps or spaces 94 (FIGS. 1 and 7) and remote from top end stops 95,95 on the stringers 18,19 while advancing at a slow rate, causing the feeler arms 87,88 to turn clockwise (FIG. 2) about the pin 89. When the microswitch 93 is actuated, the drive roller 36 is de-energized, thereby stopping the longitudinal feeding of the stringers 18,19.

In FIGS. 2 and 4, the switching and locating means 24 further comprises a slide 97 slidable on the lower frame 35, a pair of lower laterally spaced grip arms 98,99 fixedly mounted on the slide 97, and a pair of upper laterally spaced grip arms 100,101 pivotally mounted by a pin 102 on the slide 97, the upper grip arms 100,101 being normally urged by a spring 103 to coact with the lower grip arms 98,99, respectively, for gripping the stringers 18,19. The slide 97 has a shifter 104 projecting downwardly into the lower frame 35 through a slot 105 extending parallel to the direction of travel of the stringers 18,19. A pivotable drive lever 106 in the lower frame 35 drivingly engages the shifter 104 for moving the slide 97 back and forth on the lower frame 35. The upper grip arms 100,101 are pivotally movable away from the lower grip arms 98,99 to release the stringers 18,19, by a lifter pin 107 extending vertically through the slot 105 and the slide 97 and drivable by a pivotable actuator lever 108 in the lower frame. Although not shown, the drive lever 106 and the actuator lever 108 are operatively coupled together so that when the drive lever 106 is actuated to move the slide 97 toward the driver roller 36 in a direction to feed the stringers 18,19, the actuator lever 108 is lowered away from the lifter pin 107, which then remains disengaged from the upper grip arms 100, 101 to allow the stringers 18,19 to be gripped jointly by the upper grip arms 100,101 and the lower grip arms 98,99, and vice versa.

Figure 9:
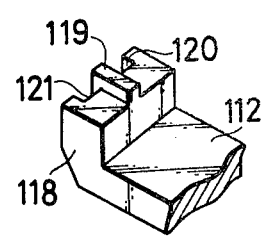
FIG. 9 is an enlarged fragmentary perspective view of a locating stop.
Figure 10:
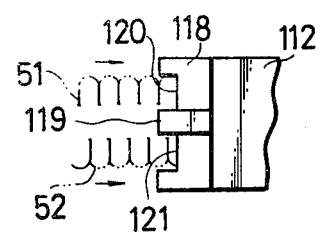
FIG. 10 is a plan view of the locating stop shown in FIG. 9.

A stop holder 110 is slidably disposed in a longitudinal slot 111 in the guide plate holder 66. A stop lever 112 is pivotally mounted through a pin 113 on the stop holder 110, which includes a shifter 114 engaged by a drive lever 115 pivotally movable back and forth to thereby enable the stop lever 112 to move therewith. A lifter pin 116 extends vertically through the stop holder 110 for acting on and lifting the stop lever 112 while it moves toward the drive roller 36 in the direction of travel of the stringers 18,19. As best illustrated in FIGS. 9 and 10, the stop lever 112 has on its distal end an upwardly projecting stop 118 including a central nose 119 and a pair of recesses 120,121 one on each side of the central nose 119 which face to the guide plates 56,57. The central nose 119 is locatable between the rows of coupling elements 51,52, and the recesses 120,121 are receptive of the terminal coupling elements when the stop lever 112 is raised by the lifter pin 116 which is elevated. During the movement of the stop holder 110 and hence the stop lever 112 to the left in FIG. 2, the lifter pin 116 is lowered out of engagement with the stop lever 112, whereupon the stop 118 descends out of the path of the slide fastener stringers 18,19.

Figure 14:
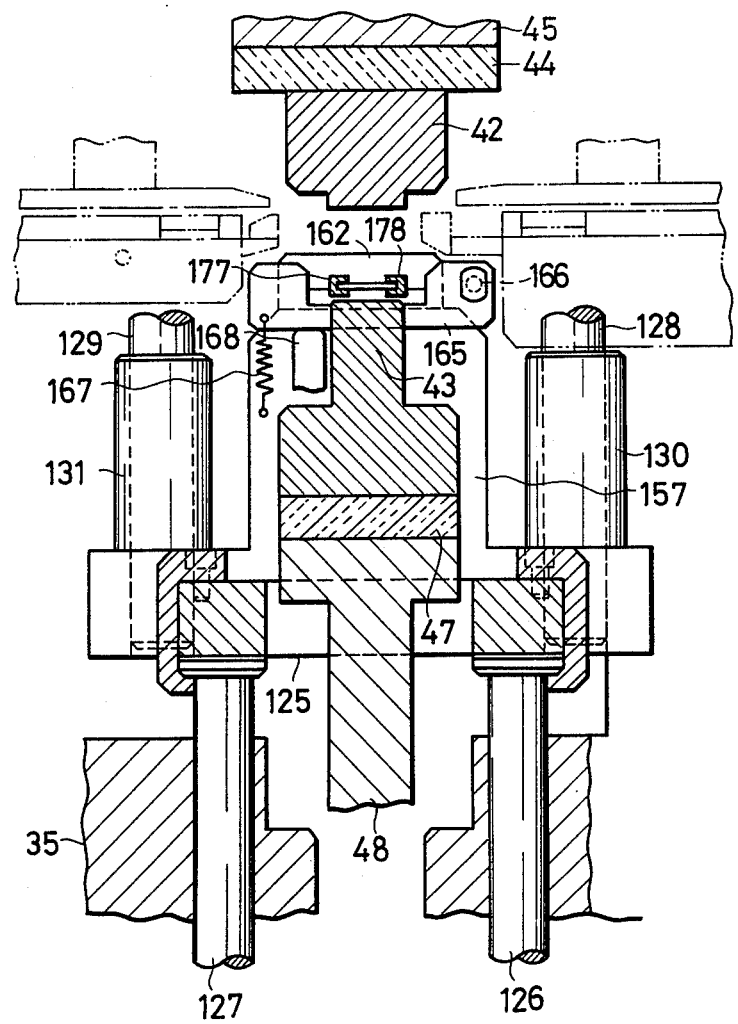
FIG. 14 is a cross-sectional view taken along XIV—XIV of FIG. 3.

As shown in FIGS. 3 and 14, a vertically movable support 125 has a pair of vertical guide pins 126,127 slidably extending through portions of the lower frame 35. A pair of vertical guide pins 128,129 extend from the upper frame 46 slidably into a pair of respective guide sleeves 130,131 projecting upwardly from the support 125. Accordingly, the support 125 is confined to vertical motion between the upper frame 46 and the lower frame 35, the support 125 being movable up and down by a fluid-pressure actuator (not illustrated) for vertically shifting the path of travel of the elongate film 26 toward the path of the stringers 18,19 in parallel relation before application of the piece 29 of reinforcing film to the stringers 18,19.

Figure 11:
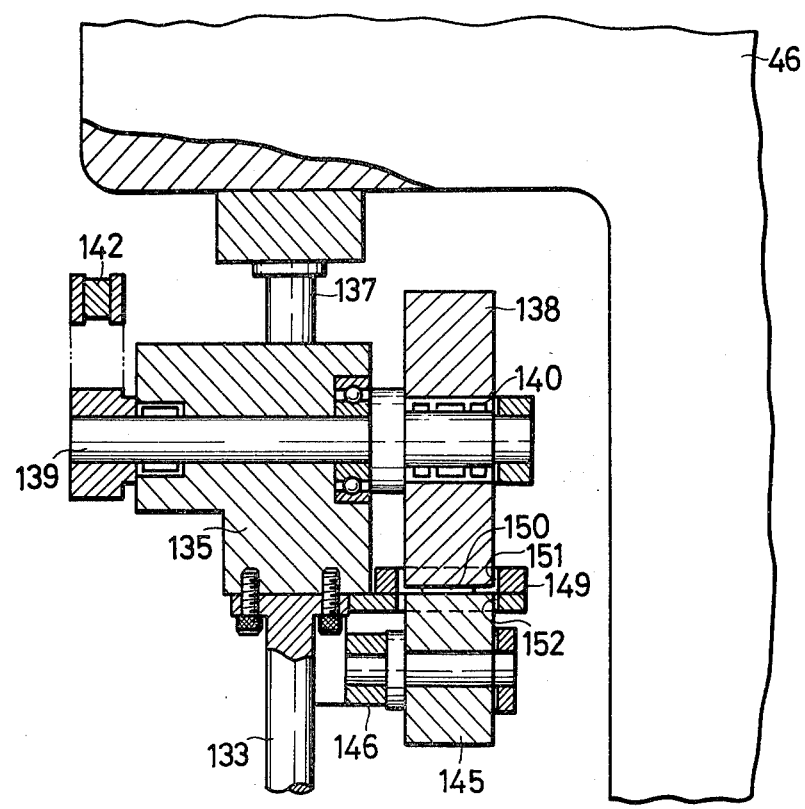
FIG. 11 is a cross-sectional view taken along line XI—XI of FIG. 3.
Figure 15:
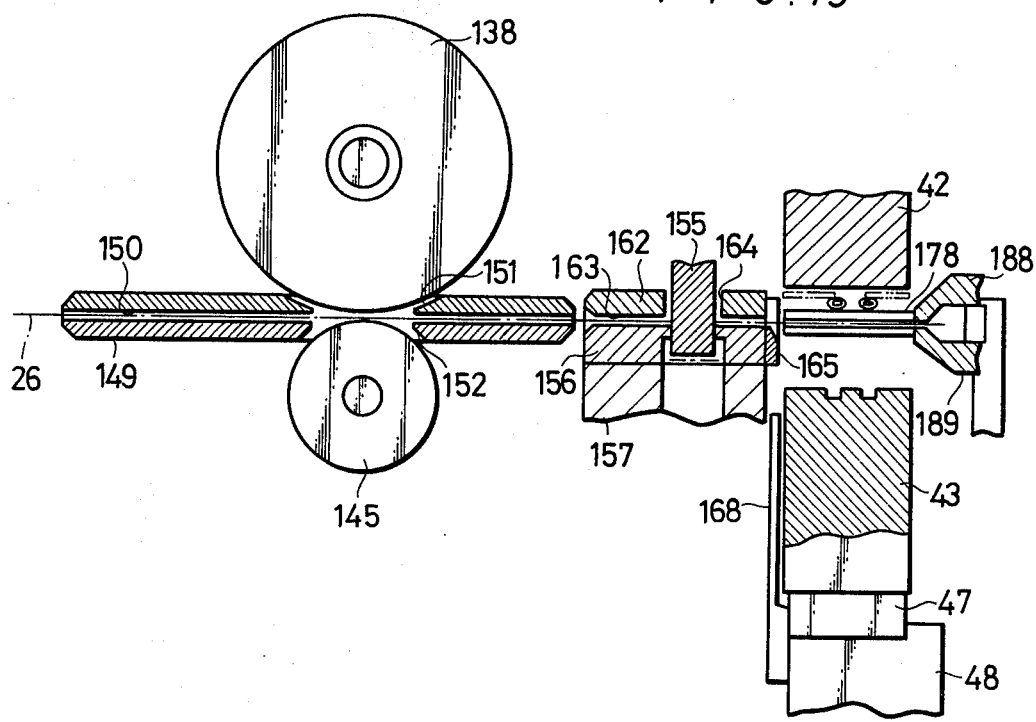
FIGS. 15 through 17 are fragmentary cross-sectional views of an operative portion of the apparatus, showing successive parts positions for forming a piece of reinforcing film and applying it to a pair of slide fastener stringers.
Figure 16:
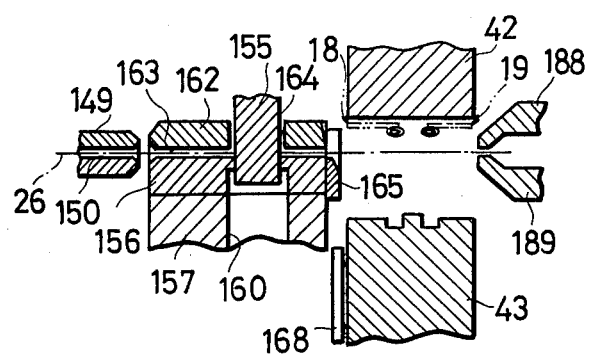
Figure 17:
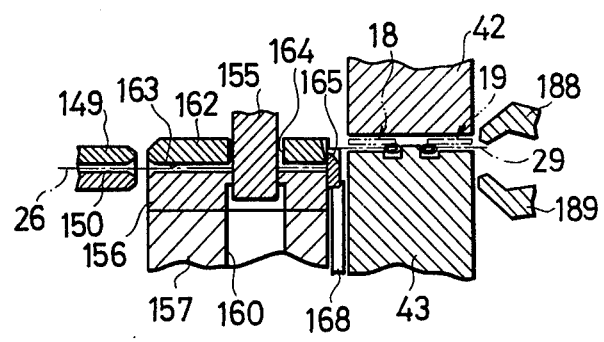

The feeding means 25 shown in FIGS. 3 and 11 comprises a vertical rod 133 fastened to a horizontal bar 134 supported on the support 125, and a roller holder 135 mounted on the vertical rod 133 and having a pair of vertical guide pins 136, 137 slidably extending into the upper frame 46. A drive roller 138 is rotatably mounted on one end of a horizontal shaft 139 journaled in the roller holder 135, there being a one-way clutch 140 interposed between the drive roller 138 and the shaft 139 such that the rotation of the shaft 139 only in one direction positively drives the drive roller 138. An arm 141 is secured to the other end of the horizontal shaft 139 and is connected through a link 142 to a piston rod 143 of a fluid-pressure actuator 144. A pinch roller 145 is rotatably supported on a support arm 146 pivotally mounted on a mount 147 secured to the roller holder 135. The pinch roller 145 is disposed downwardly of and normally urged against the drive roller 138 under the force of a spring 148. A film guide 149 is located between the drive roller 138 and the pinch roller 145 and, as best shown in FIGS. 11 and 15, has a horizontal film passage 150. The film guide 149 also has a pair of upper and lower slots 151,152 communicating with the passage 150 and into which peripheral portions of the drive roller 138 and the pinch roller 145 extend, respectively, for drivingly sandwiching the elongate web 26 of reinforcing film therebetween. The elongate web 26 of reinforcing film is longitudinally fed intermittently in increments by successive angular movements of the drive roller 138 driven by the fluid-pressure actuator 144.

As shown in FIGS. 3, 4 and 15 through 17, the forming means 28 includes a stationary punch 155 (best shown in FIG. 4) fixed to the base plate 45 and extending downwardly therefrom, and a die 156 mounted on a die holder 157 mounted on the support 125. The die 156 has a die cavity 159 providing a cutting edge for coacting with the punch 155 to form a recess 160 (FIGS. 1 and 4) in the elongate web 26 of reinforcing film. The die holder 157 has a discharge hole 161 for passage therethrough of severed debris from the web 26. A cutter die 162 is mounted on the die 156 with a horizontal passage 163 through which the elongate web 26 of reinforcing film can pass. The cutter die 162 has an opening 164 for passage therethrough of the punch 155.

A cutter blade 165, best illustrated in FIG. 12, is pivotally mounted by a pin 166 on the cutter die 162 and is normally urged downwardly clear of the path of the elongate web 26 by a spring 167. The cutter blade 165 is located at the end of the passage 163 which is adjacent to the upper and lower dies 42,43. The cutter blade 165 is lifted across the passage 163 by a lifter bar 168 secured to the ram 48.

The film guiding means 30 of FIGS. 3 and 13 includes a pair of levers 170,171 pivotally mounted by a pair of respective pins 172,173 on a support plate 174 fastened to the support 125. The levers 170,171 are normally urged toward each other by a pair of springs 175,176 so that a pair of channel-shaped film guides 177,178 which open to each other and are mounted respectively on the levers 170,171 will jointly constitute a guide passage in extending along the path of the elongate web 26 and held a position between the upper end lower dies 42,43 and below the path of the stringers 18,19 for guiding therealong the elongate web 26 coming out of the passage 163. A pair of rolls 179,180 acting as cam followers are rotatably mounted on the respective levers 170,171. A cam plate 181 disposed between the levers 170,171 has a pair of slant cam surfaces 182,183 engageable with the cam followers 179,180. The cam plate 181 is coupled via a bracket 185 to a vertical piston rod 184 of a fluid-pressure actuator 186 mounted on the support 125. As the fluid-pressure actuator 186 is actuated to withdraw the piston rod 184, the cam plate 181 is lowered to enable the slant cam surfaces 182,183 to engage and displace the cam followers 179,180 away from each other, whereupon the levers 170,171 angularly move in opposite directions perpendicularly to the path of travel of the film web 26 so as to move the film guides 177,178 away from each other.

In FIG. 3, the film holding means 27 comprises a pair of upper and lower gripping jaws 188,189 pivotally mounted on a bracket 190 on a fluid-pressure actuator 191 supported on a support plate 192 secured to the support 125. The fluid-pressure actuator 191 has a piston rod (not shown) extending in the direction of travel of the film web 26 for acting on the upper and lower gripping jaws 188,189, there being a spring (not shown) acting between the gripping jaws 188,189 to clamp the distal end of the elongate film web 26 which has passed across the path of travel of the stringers 18,19. When the fluid-pressure actuator 191 is actuated, the gripping jaws 188, 189 are spread to release the film web 26.

OPERATION

The drive roller 36 is driven to feed the slide fastener stringers 18,19 longitudinally at a rapid rate of speed until transversely aligned element-free gaps 94,94 arrive at the detector rolls 75,76, whereupon the detector rolls 75,76 are lowered respectively against the bottoms of the guide grooves 70,71 (FIG. 5) thereby swinging the actuator lever 84 clockwise to actuate the microswitch 85. Then, the stringers 18,19 are fed at a slow rate of speed. The feeler projections 90,91 on the feeler arms 87,88 are caused to be depressed by engagement with the terminal coupling elements 51,52 adjacent to the element-free gaps 94,94, thereby actuating the microswitch 93. Thus the drive roller 36 is stopped. At the same time, the drive lever 106 is actuated to move in the same direction as that of travel of the stringers 18,19, with the grip arms 98,100 and 99,101 gripping the stringers 18,19, respectively. The stringers 18,19 are advanced slowly, and then are stopped when the terminal coupling elements 51,52 abut against the stop 118 which is in its raised leftward position (FIG. 2). At this time, the element-free gaps 94,94 are located just between the upper and lower dies 42,43. Upon stoppage of the slide 97, the drive lever 115 is actuated to move the stop 118 on the stop lever 112 toward the drive roller 36, and then the lifter pin 116 is lowered to allow the stop 118 to move downwardly. Thus the stop 118 is withdrawn away from a position between the upper and lower dies 42,43. Thereafter, the clamps 60,61 and 67,68 are raised to press the stringers 18,19 against the serrated surfaces 58,65 for firmly holding the stringers 18,19.

During such movement, the elongate web 26 of reinforcing film is advanced by a distance corresponding to an angular movement of the drive roller 138, until the distal end of the film web 26 passes through the passage 163 and the channel-shaped guides 177,178 toward the gripping jaws 188,189 that are kept spread by the actuator 191. While the film web 26 is being advanced, the support 125 starts ascending. When the distal end of the film web 26 reaches the gripping jaws 188,189, the actuator 191 is inactivated to allow the gripping jaws 188,189 to grip the distal end of the film web 26. Simultaneously, the punch 155 cuts the web 26 on the cutting edge of the die 156 to thereby form a recess 160. The upward movement of the support 125 is stopped, and the fluid-pressure actuator 186 is actuated to lower the cam plate 181, thereby displacing the film guides 177,178 away from each other. Then the lower die 43 is raised toward the upper die 42. Before their coaction, the lifter bar 168 knocks the cutter blade 165 upwardly, which severs the elongate web 26 of reinforcing film at the discharge end of the passage 163. As the punch 155 extends across the film web 26 at this time, a portion of the web 26 extending between the punch 155 and the gripping jaws 188,189 is subjected to tension for reliable severance by the cutter blade 165.

The lower die 43 continues to move upwardly until it presses the severed piece 29 of reinforcing film and stringers 18,19 lying thereover against the upper die 42. The piece 29 of reinforcing film is fused to the stringer tapes 53,54 under pressure and heat from the upper and lower dies 42,43.

Although not illustrated, the sequence of operation above described can easily be controlled by a combination of limit switches (some described and illustrated) and a cam (not shown) on a rotatable shaft.

What is claimed is:

1. An apparatus for applying pieces of reinforcing film to a pair of continuous slide fastener stringers at spaced locations thereof, comprising:
   (a) means for feeding the stringers longitudinally along a first path selectively at a rapid rate or a slow rate;
   (b) means for sensing one of the locations on the stringers at a time to switch said feeding means from a rapid rate to a slow rate mode of operation and then to a stopping mode, and for locating said one of the locations on the stringers in a position for the application of one of the pieces of reinforcing film;
   (c) means for holding the stringers during the film-piece application;
   (d) means for intermittently feeding an elongate web of reinforcing film longitudinally along a second path extending transversely to said first path;
   (e) means for holding a distal end of the elongate web which has passed across said first path;
   (f) means for guiding the elongate web toward said holding means;
   (g) means for successively forming the pieces of reinforcing film one at a time from the elongate web; and
   (h) means for applying said one of the pieces of reinforcing film to the stringers at said one of the locations thereof while the stringers are at rest.

2. An apparatus according to claim 1, said applying means (h) comprising a pair of thermal dies between which said first and second paths intersect, one of said dies being stationary and the other die being movable toward said one of the dies for coaction therewith to fuse the piece of reinforcing film to the stringers.

3. An apparatus according to claim 1, said holding means (c) comprising at least a pair of stationary guide plates spaced from each other with said first path extending therebetween, and a pair of clamps movable through one of said guide plates across said first path toward the other guide plate for pressing the respective stringers thereagainst.

4. An apparatus according to claim 3, said one of the guide plates having a serrated surface, and each of said clamps having a serrated surface that confronts said first-mentioned serrated surface.

5. An apparatus according to claim 1, said feeding means comprising a drive roller and a pinch roller for drivingly sandwiching the stringers therebetween.

6. An apparatus according to claim 1, the slide fastener stringers including respective rows of coupling elements and element-free gaps at the locations thereof, said means (b) comprising a pair of pivotally cantilevered detector rolls disposed upstream of said applying means (h) along said first path for rolling engagement with the rows of coupling elements, an actuator lever coupled to said rollers for angular displacement, and a microswitch actuatable by said actuator lever when said detector rollers are pivotally moved into the element-free gaps, for the control of said feeding means (a) from the rapid rate to the slow rate mode of operation.

7. An apparatus according to claim 1, the slide fastener stringers including respective rows of coupling elements and element-free gaps at the locations thereof, said means (b) comprising a pair of feeler projections disposed upstream of said applying means (d) along said first path and positionable in the element-free gaps, and an actuator lever coupled to said feeler projections, and a microswitch actuatable by said actuator lever when said feeler projections are displaced by engagement with terminal coupling elements adjacent to the element-free gaps, for the control of said feeding means (a) from the slow rate mode of operation to the stopping mode.

8. An apparatus according to claim 1, the stringers including respective rows of coupling elements and element-free gaps at the location thereof, said means (b) comprising two pairs of gripper arms movable along said first path for gripping and advancing the stringers after said feeding means has been stopped, said gripper arms being located downstream of said applying means (h) along said first path, and a stop engageable with terminal coupling elements adjacent to the element-free gaps for locating the element-free gaps in said position, said stop being withdrawable away from said position when the element-free gaps are in said position.

9. An apparatus according to claim 1, including support means on which said feeding means (d), holding means (e), guiding means (f) and forming means (g) are mounted, said support means being movable for shifting said second path toward said first path in parallel relation.

10. An apparatus according to claim 1, said feeding means (e) comprising a drive roller angularly movable incrementally and a pinch roller pressed against said drive roller for feeding the elongate web of reinforcing film therebetween for a distance corresponding to the angular movement of said drive roller.

11. An apparatus according to claim 1, said forming means (g) being located upstream of said applying means (g) along said second path, and comprising a punch, a die for coacting with said punch to form a recess in the elongate web, a cutter die mounted on said die with a passage therebetween through which said second path extends, and a cutter blade pivotally mounted on said cutter die and movable across said second path for coacting with said cutter die to sever the elongate web into the pieces of reinforcing film.

12. An apparatus according to claim 1, said guiding means (f) comprising a pair of pivotable levers having a pair of respective film guides for jointly guiding the elongate web toward said holding means (e) across said position, said pivotable levers being angularly movable in opposite directions to displace said film guides away from each other.

13. An apparatus according to claim 12, said film guides having a channel-shaped cross section opening toward each other and extending along said second path for guiding the elongate web therebetween.

14. An apparatus according to claim 1, said holding means (e) comprising a pair of gripping jaws for gripping therebetween said distal end of the elongate web.

* * * * *